United States Patent
Misaki et al.

(10) Patent No.: US 12,220,954 B2
(45) Date of Patent: Feb. 11, 2025

(54) PNEUMATIC TIRE

(71) Applicant: SUMITOMO RUBBER INDUSTRIES, LTD., Kobe (JP)

(72) Inventors: Momoka Misaki, Kobe (JP); Dong Miao, Kobe (JP); Hiroki Kawai, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/563,526

(22) Filed: Dec. 28, 2021

(65) Prior Publication Data

US 2022/0212501 A1    Jul. 7, 2022

(30) Foreign Application Priority Data

Jan. 5, 2021    (JP) ................... 2021-000590

(51) Int. Cl.
| | |
|---|---|
| *B60C 9/18* | (2006.01) |
| *B60C 9/00* | (2006.01) |
| *B60C 9/20* | (2006.01) |
| *B60C 11/00* | (2006.01) |
| *B60C 11/03* | (2006.01) |
| *C08L 9/06* | (2006.01) |
| *B60C 1/00* | (2006.01) |

(52) U.S. Cl.
CPC .......... *B60C 9/1821* (2013.01); *B60C 9/0064* (2013.01); *B60C 9/20* (2013.01); *B60C 11/0008* (2013.01); *B60C 11/033* (2013.01); *C08L 9/06* (2013.01); *B60C 2001/0066* (2013.01); *B60C 2009/2077* (2013.01); *B60C 2009/2083* (2013.01); *B60C 2011/0025* (2013.01); *C08L 2205/03* (2013.01)

(58) Field of Classification Search
CPC . B60C 9/0064; B60C 9/18; B60C 2009/2067; B60C 2009/2016; B60C 2009/2083; B60C 11/0008; B60C 2011/0025; B60C 2011/0033

See application file for complete search history.

(56) References Cited

U.S. PATENT DOCUMENTS

| | | | | | |
|---|---|---|---|---|---|
| 5,332,017 | A | * | 7/1994 | Imamiya | ............... B60C 9/0064 152/526 |
| 5,370,167 | A | * | 12/1994 | Kogure | .................... B60C 9/18 152/537 |
| 2012/0312441 | A1 | * | 12/2012 | Harikae | ................ B60C 9/2006 152/527 |
| 2020/0032037 | A1 | | 1/2020 | Takano et al. | |
| 2023/0125591 | A1 | | 4/2023 | Tsuchida | |
| 2023/0202235 | A1 | | 6/2023 | Ono et al. | |

FOREIGN PATENT DOCUMENTS

| | | | | |
|---|---|---|---|---|
| EP | 3254872 B1 | * | 11/2018 | ........... B60C 11/033 |
| JP | 2005-28999 A | | 2/2005 | |
| JP | 2008-189048 A | | 8/2008 | |
| JP | 2018-178034 A | | 11/2018 | |
| JP | 2019-89911 A | | 6/2019 | |
| JP | 2019-206643 A | | 12/2019 | |
| JP | 6769573 B1 | | 10/2020 | |
| JP | 6800435 B1 | * | 12/2020 | |
| WO | WO 2018/186367 A1 | | 10/2018 | |
| WO | WO2020/179582 A1 | | 9/2020 | |

* cited by examiner

*Primary Examiner* — Cedrick S Williams
(74) *Attorney, Agent, or Firm* — Birch, Stewart, Kolasch & Birch, LLP

(57) ABSTRACT

To provide a pneumatic tire excellent in steering stability and fuel efficiency at high-speed driving, it is provided a pneumatic tire having a tread portion with a circumferential groove and a belt layer, wherein a monofilament cord is used as a reinforcing cord for the belt layer; the number of arrangements e (lines/5 cm) of the monofilament cords arranged per 5 cm in the tire width direction in the tire radial cross section of the belt layer is 50/5 cm or more; and the distance G (mm) from the surface of the land portion closest to the equatorial plane among land portions separated by the circumferential groove to the monofilament cord, and the loss tangent (30° C. tan δ) when the rubber composition constituting the surface of the tread portion is measured under conditions of temperature: 30° C., initial strain: 5%, dynamic strain: ±1%, frequency: 10 Hz, and deformation mode: tensile, satisfy 30° C. tan δ×G<1.5.

13 Claims, No Drawings

PNEUMATIC TIRE

TECHNICAL FIELD

The present invention relates to pneumatic tires, more particularly pneumatic tires with a belt layer.

BACKGROUND ART

In recent years, from the viewpoint of increasing interest in environmental issues and economic efficiency, there has been an increasing demand for fuel efficiency in automobiles and for improved fuel efficiency of pneumatic tires (hereinafter, simply referred to as "tires") installed in automobiles as well.

The fuel efficiency of a tire can be evaluated by the rolling resistance, and it is known that the smaller the rolling resistance, the better the fuel efficiency of the tire.

Therefore, conventionally, it has been proposed to reduce the rolling resistance by devising the composition of the rubber composition constituting the tread portion of the tire (for example, Patent Documents 1 to 4).

PRIOR ART DOCUMENT

Patent Document

Patent Document 1: JP-A-2018-178034
Patent Document 2: JP-A-2019-089911
Patent Document 3: WO2018/186367A1
Patent Document 4: JP-A-2019-206643

SUMMARY OF THE INVENTION

Problems to be Solved by the Invention

However, each of the above technologies targets rolling resistance during normal driving. In recent years, high-speed driving has become common due to the well-developed highways, and further improvement in steering stability and fuel efficiency during high-speed driving are required.

Therefore, the object of the present invention is to provide pneumatic tires with excellent steering stability and fuel efficiency during high-speed driving.

Means for Solving Problems

The present inventor has earnestly studied the solution to the above problem, found that the above problem can be solved by the invention described below, and completed the present invention.

The invention according to a first embodiment is:
a pneumatic tire having a tread portion with a circumferential groove and a belt layer, wherein
a monofilament cord is used as a reinforcing cord for the belt layer; the number of arrangements e (lines/5 cm) of the monofilament cords arranged per 5 cm in the tire width direction in the tire radial cross section of the belt layer is 50/5 cm or more; and
the distance G (mm) from the surface of the land portion closest to the equatorial plane among land portions separated by the circumferential groove to the monofilament cord, and the loss tangent (30° C. tan δ) when the rubber composition constituting the surface of the tread portion is measured under conditions of temperature: 30° C., initial strain: 5%, dynamic strain: ±1%, frequency: 10 Hz, and deformation mode: tensile, satisfy the following formula 1.

$$30° \text{C. tan } \delta \times G < 1.5 \qquad \text{formula 1}$$

The invention according to a second embodiment is: the pneumatic tire according to the first embodiment, wherein the following formula 2 is satisfied.

$$30° \text{C. tan } \delta \times G < 1.0 \qquad \text{formula 2}$$

The invention according to a third embodiment is:
the pneumatic tire according to the first or second embodiment, wherein the number of arrangements e (lines/5 cm) of the monofilament cord and the outer diameter r (mm) of the monofilament cord satisfy the following formula 3.

$$e \times r^2 / 4 \times \pi > 4.0 \qquad \text{formula 3}$$

The invention according to a fourth embodiment is:
the pneumatic tire according to the third embodiment, wherein the following formula 4 is satisfied.

$$e \times r^2 / 4 \times \pi > 5.0 \qquad \text{formula 4}$$

The invention according to a fifth embodiment is:
the pneumatic tire according to the first to fourth embodiments, wherein the loss tangent (0° C. tan δ) when the rubber composition constituting the surface of the tread portion is measured under conditions of temperature: 0° C., initial strain: 5%, dynamic strain: ±0.25%, frequency: 10 Hz, and deformation mode: tensile, is 0.5 or more.

The invention according to a sixth embodiment is:
the pneumatic tire according to the fifth embodiment, wherein the loss tangent (0° C. tan δ) is 0.7 or more.

The invention according to a seventh embodiment is:
the pneumatic tire according to the first to sixth embodiment, wherein the loss tangent (0° C. tan δ) and the distance G (mm) satisfy the following formula 5.

$$0° \text{C. tan } \delta / G < 0.14 \qquad \text{formula 5}$$

The invention according to an eighth embodiment is:
the pneumatic tire according to the seventh embodiment, wherein the following formula 6 is satisfied.

$$0° \text{C. tan } \delta / G < 0.10 \qquad \text{formula 6}$$

The invention according to a ninth embodiment is:
the pneumatic tire according to the first to eighth embodiment, wherein the angle formed by the monofilament cord and the straight line parallel to the tire circumferential direction is 10° or more and 35° or less.

The invention according to a tenth embodiment is:
the pneumatic tire according to the first to ninth embodiment, wherein the outer diameter r (mm) of the monofilament cord is 0.1 mm or more and 0.5 mm or less.

The invention according to an eleventh embodiment is:
the pneumatic tire according to the first to tenth embodiment, wherein at least two layers of the belt layer are provided, and at least one set of belt layers adjacent to each other in the radial direction of the tire is arranged at a distance of 0.1 mm or more and 0.8 mm or less.

The invention according to a twelfth embodiment is:
the pneumatic tire according to the first to eleventh embodiment, wherein
the tread portion has a plurality of circumferential grooves extending continuously in the tire circumferential direction, and the total cross-sectional area of the plurality of circumferential grooves is 10% or more and 30% or less of the cross-sectional area of the tread portion.

The invention according to a thirteenth embodiment is:
the pneumatic tire according to the first to twelfth embodiment, wherein the tread portion has a plurality of circumferential grooves extending continuously in the tire circumferential direction, and the ratio ($L_{80}/L_0$) of the groove width $L_{80}$ at a depth of 80% of the maximum depth of the circumferential groove to the groove width $L_0$ of the circumferential groove on the ground contact surface of the tread portion is 0.3 or more and 0.7 or less.

The invention according to a fourteenth embodiment is:

the pneumatic tire according to the first to thirteenth embodiment, wherein the tread portion further has a plurality of lateral grooves extending in the tire axial direction, and the total volume of the plurality of lateral grooves is 2.0% or more and 5.0% or less of the volume of the tread portion.

Effect of the Invention

According to the present invention, it is possible to provide a pneumatic tire having excellent steering stability and fuel efficiency during high-speed driving.

EMBODIMENTS FOR CARRYING OUT THE INVENTION

[1] Characteristics of the Tire According to the Present Invention

First, the characteristics of the pneumatic tire according to the present invention (hereinafter, also simply referred to as "tire") will be described.

1. Overview

The tire according to the present invention is a pneumatic tire provided with a tread portion and a belt layer, a monofilament cord is used as a reinforcing cord for the belt layer and the number of arrangement of monofilaments arranged per 5 cm in the tire width direction (hereinafter, also called "ends") e (line/5 cm) is 50lines/5 cm or more.

And the distance G (mm) from the surface of the land portion closest to the equatorial plane among land portions separated by the circumferential groove to the monofilament cord, and the loss tangent (30° C. tan δ) when the rubber composition constituting the surface of the tread portion (tread rubber composition) is measured under conditions of temperature: 30° C., initial strain: 5%, dynamic strain: ±1%, frequency: 10 Hz, and deformation mode: tensile, satisfy the following formula 1.

$$30° \text{ C. tan } \delta \times G < 1.5 \qquad \text{formula 1}$$

By having these characteristics, as will be described later, it is possible to provide a pneumatic tire having excellent steering stability and fuel efficiency during high-speed driving.

In the above description, ends e is the average number of monofilament cords arranged in the tire width direction in a state where the tire is assembled to a regular rim and has an internal pressure of 250 kPa and no load. Simply it can be obtained by measuring the number of monofilament cords arranged in a width of 5 to 10 cm centered on the equatorial plane of the tire on a section cut out in the tire radial direction with a thickness of 2 to 4 cm and calculating the average number of arrangements per 5 cm.

Further, in the above description, the distance G is the direct distance from the tread surface on the tire equatorial plane to the surface of the monofilament cord on the outermost layer of the belt layer in the tire radial cross section when the tire is assembled to a regular rim, the internal pressure is 250 kPa and no load is applied. When a groove is formed on the equatorial surface of the tread, the distance G is the direct distance from the intersection of the line obtained by connecting the ends of the tire contact surface of the groove and the equatorial surface of the tire to the outermost layer of the belt layer. When no monofilament cord of the outermost layer of the belt layer exists on the equatorial plane of the tire, the intersection of the line connecting the two points on the outermost side of the tire radial direction of the pair of monofilament cords closest to the equatorial plane and the equatorial plane is regarded as the position of the outermost layer of the belt layer, and the direct distance to the tread surface is defined as the distance G. Simply, it is possible to obtain in a state where the bead portion of the section cut out in the tire width direction with a thickness of 2 to 4 cm is pressed down according to the corresponding rim width.

Here, the "regular rim" is a rim defined for each tire in the standard system including the standard on which the tire is based. For example, in the case of JATTA (Japan Automobile Tire Association), standard rims in applicable sizes described in "JATTA YEAR BOOK", in the case of ETRTO (The European Tire and Rim Technical Organization), "Measuring Rim" described in "STANDARDS MANUAL", and in the case of TRA (The Tire and Rim Association, Inc.), "Design Rim" described in "YEAR BOOK" mean the "regular rim". In the case of tires that are not specified in the standard, it means a rim having the smallest rim diameter, and then having the narrowest width among the rims which can be assembled and the internal pressure can be maintained, that is, rims not causing air leakage between the rim and the tire.

Further, 30° C. tan δ can be measured using, for example, a viscoelasticity measuring device of "Iplexer (registered trademark)" manufactured by GABO.

2. Mechanism of Effect Manifestation in Tire According to the Present Invention

The mechanism of effect manifestation in the tire according to the present invention, that is, the mechanism that can provide a pneumatic tire with excellent steering stability and fuel efficiency during high-speed driving is presumed as follows.

In the present invention, as a belt layer for reinforcing the tread portion, a belt layer in which a cord made of monofilament (single wire) (monofilament cord) is arranged instead of a cord made of stranded wire (stranded wire cord) is used. Unlike the twisted cord, the monofilament cord is unlikely to stretch, so that the stretching of the belt layer can be suppressed. Further, by making ends e 50 lines/5 cm or more, that is, by arranging the monofilament cord in a dense state at intervals of 1 mm or less per one, it is considered that the belt layer can exert sufficient restraint on the tread portion. As a result, it is considered that, even when driving at high speed, changes (rounded) of the surface shape of the tread portion affected by centrifugal force and internal pressure are unlikely to occur, and the deformation of the tread due to rolling during high-speed driving can be reduced, so sufficient low rolling resistance can be ensured and excellent fuel efficiency can be achieved.

However, when the monofilament cords are densely arranged as described above, although the reaction force generated in the belt layer can be increased, the time from the input from the road surface to the response when the rudder angle is set is shortened at high speed, and the belt layer cannot be instantly deformed. As a result, there is a concern that the tread portion will be separated from the road surface before showing a sufficient response, and the steering stability during high-speed driving will be lowered.

Therefore, in the present invention, further, 30° C. tan δ of the tread rubber composition and the distance G (mm) satisfy 30° C. tan δ×G<1.5 (formula 1).

Since the loss tangent tan δ can be considered as a parameter representing the phase lag between stress and strain with respect to the input, it is considered that when the product of 30° C. tan δ and the distance G is reduced, as shown in (formula 1), the transmission of the input to the belt layer and the reaction force are accelerated, and, at the same time, a large reaction force can be obtained from the belt layer composed of monofilament, and the reaction force can be efficiently transmitted to the road surface, so that the steering stability can be improved even during high-speed driving.

As described above, in the present invention, the improvement of the restraint by making the end dense and the improvement of the transmissibility of the input and the reaction force by reducing the product of the 30° C. tan δ and the distance G cooperate, and as a result, it is possible to provide a pneumatic tire which is excellent not only in fuel efficiency during high-speed driving but also in steering stability during high-speed driving.

It is more preferable that 30° C. tan δ×G is less than 1.0 (satisfying the formula 2).

In the present invention, the specific distance G (mm) is preferably 12.0 mm or less, more preferably 10.0 mm or less, and further preferably 7.5 mm or less. If it exceeds 12.0 mm, the distance from the surface of the tread portion to the belt layer becomes too long, and it becomes difficult to transmit the shear deformation generated on the surface of the tread portion to the belt layer. It is considered that, as a result, it will be difficult to obtain sufficient reaction force and the effect of improving the steering stability during high-speed driving. The lower limit is preferably 6.0 mm or more, and more preferably 7.0 mm or more. If it is less than 6.0 mm, the thickness of the tread portion becomes thin, so that the rigidity of the tread portion in the tire radial direction decreases. As a result, there is a concern that the amount of deformation during rolling increases, and the effect of improving fuel efficiency may decrease.

[2] A More Preferable Aspect of the Tire According to the Present Invention.

The tire according to the present invention can obtain a larger effect by taking the following aspects.

1. Relationship Between the End of the Monofilament Cord and the Outer Diameter

In the present invention, the ends e (lines/5 cm) of the monofilament cord and the outer diameter r (mm) of the monofilament cord preferably satisfy e×r²/4×π>4.0 (formula 3), and more preferably satisfy e×r²/4×π>5.0 (formula 4).

That is, r²/4×π is the cross-sectional area per one monofilament cord, the product of the ends e is a total area occupied by the entire monofilament cord in the cross section of the belt layer. By increasing the area occupied by the monofilament cord in the cross section of the belt layer in this way, even if a large centrifugal force or internal pressure is applied to the belt layer during high-speed driving, it is considered that deformation (rounded) of the tread portion can be suppressed with sufficient restraint force. As a result, it is considered that the low rolling resistance is further improved and more excellent fuel efficiency can be exhibited. At the same time, since the rigidity of the belt layer is also increased, it is easy to obtain a large reaction force, and it is considered that the steering stability at high-speed driving is also improved.

The outer diameter r of the monofilament cord refers to the outer diameter of the monofilament cord in the tire width direction in the tire, and is equal to the normal outer diameter when the cross section of the monofilament cord is a perfect circle. On the other hand, in the case of a flat monofilament cord, the outer diameter of the monofilament cord is defined by the distance obtained by Φ×cos θ when the major axis is Φ (mm) and the angle formed by the major axis Φ (mm) and the line parallel to the tire width direction is θ.

The specific outer diameter of the monofilament cord is preferably 0.1 mm or more and 0.5 mm or less. If it is less than 0.1 mm, the force that can be generated by one monofilament cord is weak, and there is a concern that sufficient responsiveness cannot be obtained during high-speed driving. On the other hand, if the outer diameter is more than 0.5 mm, when the monofilament cords are arranged, it may be difficult to cover the monofilament cords with rubber without gaps to form a belt layer. In addition, since the distance between the monofilament cords becomes narrow, the monofilament cord layer is less likely to be deformed in the width direction during turning, and there is a concern that sufficient stress cannot be generated, which may reduce the effect of improving steering stability. It is more preferably 0.15 mm or more, and further preferably 0.2 mm or more. Regarding the upper limit, it is more preferably 0.40 mm or less, and further preferably 0.35 mm or less.

2. Tan δ at 0° C. of the Tread Rubber Composition

It is considered that the outermost surface of the rubber composition is easily cooled by air during high-speed driving, and the temperature is lower than the actual temperature. Therefore, it is considered that friction can be easily generated between the road surface and the tire surface by improving the heat generation at a temperature lower than the tire temperature during actual driving.

Specifically, the loss tangent (0° C. tan δ) when the tread rubber composition is measured under the conditions of temperature: 0° C., initial strain: 5%, dynamic strain: ±0.25%, frequency: 10 Hz, deformation mode: tensile is preferably 0.5 or more, and more preferably 0.7 or more.

Note that 0° C. tan δ can be measured using, for example, a viscoelasticity measuring device of "Iplexer (registered trademark)" manufactured by GABO, as in the case of 30° C. tan δ.

3. Relationship Between 0° C. Tan δ and Distance G

As described above, the tread rubber composition preferably has a 0° C. tan δ of 0.5 or more, but it is considered that, at this time, if the distance G is appropriate, the steering stability at high-speed driving can be maintained more appropriately.

Specifically, when the distance G is large, since the distance between the belt layer and the tread surface is long, it is considered that the input generated on the tread surface is likely to be lost inside the tread. Therefore, even if a larger input is generated on the tread surface, it is considered that good steering stability during high-speed driving can be obtained by increasing the heat generation on the tread surface according to the distance to the belt layer.

Therefore, as the preferable relationship between 0° C. tan δ and the distance G was examined, it turned out to be preferable that they satisfy 0° C. tan δ/G<0.14 (formula 5), and more preferable that they satisfy 0° C. tan δ/G<0.10 (formula 6).

4. Monofilament Cord Angle

In the present invention, the monofilament cord is preferably arranged so as to form an angle of 10° or more and 350 or less with a straight line parallel to the tire circumferential direction.

By arranging the belt layer so that the monofilament cord tilts at an appropriate angle, almost the entire width of the tread portion is firmly restrained, the amount of deformation of the tread portion during rolling is suppressed, and the reaction force toward the road surface from the monofilament cord can be transmitted in a well-balanced manner at all angles with respect to the axial direction of the tire, it is possible to further improve the steering stability and fuel efficiency during high-speed driving.

5. Multi-Layered Belt Layer

In the present invention, at least two belt layers are provided to form a multi-layer structure, and they are preferably arranged so that at least one set of belt layers adjacent to each other in the radial direction of the tire is separated by a distance of 0.1 mm or more and 0.8 mm or less. The distance is more preferably 0.2 mm or more, and further preferably 0.3 mm or more. On the other hand, it is more preferably 0.7 mm or less, and further preferably 0.6 mm or less.

As a result, since one set of belt layers cooperates with each other to appropriately restrain the tread portion, and suppress the amount of deformation of the tread portion at the time of rolling, and the reaction force from the monofilament cord toward the road surface can be transmitted in a well-balanced manner at all angles with respect to the axial direction of the tire, it is possible to further improve steering stability and fuel efficiency during high-speed driving.

The distance between the belt layers described above can be expressed by an average distance in the width direction, and can be obtained by measuring the distance from the innermost layer portion on the surface side to the surface of the inner layer on the equatorial plane.

At this time, when at least one set of adjacent belt layers is arranged so that the cords of each other intersect with each other, a tightening effect can be obtained and almost the entire width of the tread portion is firmly restrained so that the amount of deformation of the tread portion can be suppressed at the time of rolling, and fuel efficiency and steering stability during high-speed driving can be further improved.

6. Circumferential Groove on the Tread

In the present invention, the total cross-sectional area of the plurality of circumferential grooves is preferably 10% or more and 30% or less of the cross-sectional area of the tread portion. As a result, the movement of the tread part is suppressed and the steering stability and fuel efficiency of the vehicle can be improved at high-speed driving. It is more preferably 15% or more, further preferably 18% or more, and particularly preferably 21% or more. On the other hand, it is more preferably 27% or less, further preferably 25% or less, and particularly preferably 23% or less.

The above-mentioned cross-sectional area of the circumferential groove refers to the total value of the area composed of a straight line connecting the ends of the tread circumferential groove and a groove wall in a tire mounted on a regular rim, having an internal pressure of 250 kPa and in a no-load state. Simply, it is possible to obtain in a state where the bead portion of the section cut out in the tire radial direction with a width of 2 to 4 cm is pressed down according to the rim width.

The cross-sectional area of the tread portion refers to the area outside the tire radial direction from the belt layer in the region separated by a straight line connecting the circumferential groove ends of the tread portion and two straight lines parallel to the equatorial plane that pass through both ends of the widest among the tread surface profile formed by the tread surface and belt layer, in the radial cross section of the tire mounted on a regular rim and having an internal pressure of 250 kPa and in a no-load state. When a belt reinforcing layer using organic fibers and/or steel cords is provided on the outer side in the radial direction of the tire from the belt layer, it refers to the area on the outer side in the radial direction of the belt reinforcing layer.

Further, the ratio of the groove width $L_{80}$ at a depth of 80% of the maximum depth of the circumferential groove to the groove width $L_0$ on the contact surface of the tread portion ($L_{80}/L_0$) is preferably 0.3 or more, and 0.7 or less. It is more preferably 0.35 or more, further preferably 0.40 or more, and particularly preferably 0.45 or more. On the other hand, it is more preferably 0.65 or less, further preferably 0.60 or less, and particularly preferably 0.55 or less.

As a result, the movement of the entire land portion can be suppressed on the bottom surface of the land portion of the tread portion, and steering stability and fuel efficiency during high-speed driving can be improved.

The above-mentioned $L_0$ and $L_{80}$ refer to the direct distance ($L_0$) between the groove end portions of the tread circumferential groove on the tread surface portion of the tire and the minimum distance ($L_{80}$) between the groove wall at a groove depth of 80% in a tire mounted on a regular rim, having internal pressure of 250 kPa and in a no-load state. Simply, it is possible to obtain in a state where the bead portion of the section cut out in the tire radial direction with a width of 2 to 4 cm is pressed down according to the corresponding rim width.

7. Lateral Groove

In the present invention, the tread portion further has a plurality of lateral grooves extending in the tire axial direction, and the total volume of the plurality of lateral grooves is preferably 2.0% or more and 5.0% or less of the volume of the tread portion. It is more preferably 2.2% or more, further preferably 2.5% or more, and particularly preferably 2.7% or more. On the other hand, it is more preferably 4.0% or less, further preferably 3.5% or less, and particularly preferably 3.0% or less.

As a result, it is possible to suppress the movement of the tread portion and improve steering stability and fuel efficiency during high-speed driving.

The volume of the tread portion described above refers to the volume obtained by extending the area of the tread portion in the tire circumferential direction. Simply, it can be obtained by multiplying the area of the tread portion by the length of the outer circumference of the tire (outer diameter $D t \times \pi$). The volume of the lateral groove refers to the total of the volume composed of the surface connecting the ends of the lateral groove and the groove wall in a tire mounted on a regular rim, having an internal pressure of 250 kPa and in a no-load state. It can be calculated by obtaining the volume of each lateral groove.

The volume of the lateral groove refers to the total of the volume composed of the surface connecting the ends of the lateral groove and the groove wall in a tire mounted on a regular rim and having an internal pressure of 250 kPa and in a no-load state. The volume of the lateral groove can be simply obtained by calculating the volume of each lateral groove in a state where the bead portion of the section cut out in the radial direction with a width of 2 to 4 cm is pressed down according to the rim width. Further, the volume of the tread portion can be calculated by calculating the area of the portion not including the lateral groove from the section and multiplying it by the outer diameter and obtaining the difference from the volume of the lateral groove.

[3] Embodiment

Hereinafter, the present invention will be specifically described based on the embodiments.

1. Rubber Composition Constituting the Outermost Layer of the Tread Portion (1) Compounding Material The rubber composition forming the outermost surface layer of the tread portion of the tire according to the present invention can be obtained from the rubber components described below and other compounding materials.

(a) Rubber Component

In the present embodiment, the rubber component is not particularly limited, and rubber (polymer) generally used in the manufacture of tires can be used. Examples thereof include diene rubber such as isoprene-based rubber, butadiene rubber (BR), styrene butadiene rubber (SBR), and nitrile rubber (NBR); and butyl rubber such as butyl rubber. These may be used alone or in combination of two or more, but it is preferable to contain any one of isoprene-based rubber, BR, and SBR and isoprene-based rubber. It may contain isoprene-based rubber and BR, BR and SBR, isoprene-based rubber and SBR, or isoprene-based rubber and BR and SBR.

(B) SBR

The content of SBR in 100 parts by mass of the rubber component is preferably more than 50 parts by mass, more preferably more than 75 parts by mass, further preferably more than 80 parts by mass, and particularly preferably more than 85 parts by mass, for example, from the viewpoint of steering stability during high-speed driving. On the other hand, from the viewpoint of heat generation during high-speed driving, it is preferably less than 100 parts by mass, and more preferably less than 95 parts by mass.

The weight average molecular weight of SBR is, for example, more than 100,000 and less than 2 million. The styrene content of SBR is preferably more than 5% by mass, more preferably more than 10% by mass, and further preferably more than 20% by mass, for example, from the viewpoint of obtaining steering stability at high-speed driving. On the other hand, from the viewpoint of heat generation and durability performance during high-speed driving, it is preferably less than 50% by mass, more preferably less than 40% by mass, and further more preferably less than 35% by mass. The vinyl bond amount (1,2-bonded butadiene unit amount) of SBR is, for example, more than 5% by mass and less than 70% by mass. The structure identification of SBR (measurement of styrene content and vinyl bond amount) can be performed using, for example, an apparatus of the JNM-ECA series manufactured by JEOL Ltd.

The SBR is not particularly limited, and for example, emulsion-polymerized styrene-butadiene rubber (E-SBR), solution-polymerized styrene-butadiene rubber (S-SBR) and the like can be used. The SBR may be either a non-modified SBR or a modified SBR.

The modified SBR may be any SBR having a functional group that interacts with a filler such as silica. Examples thereof include terminal modified SBR (terminal modified SBR having the functional group at the end) in which at least one end of the SBR is modified with a compound having the above functional group (modifier), main chain modified SBR having the functional group in the main chain, and main chain terminal modified SBR having the functional group in the main chain and the terminal (for example, main chain terminal modified SBR having the above functional group in the main chain and at least one end modified with the above modifier) and terminally modified SBR which is modified (coupling) by a polyfunctional compound having two or more epoxy groups in the molecule and into which a hydroxyl group or an epoxy group has been introduced.

Examples of the functional group include an amino group, an amide group, a silyl group, an alkoxysilyl group, an isocyanate group, an imino group, an imidazole group, a urea group, an ether group, a carbonyl group, an oxycarbonyl group, a mercapto group, a sulfide group, a disulfide group, a sulfonyl group, a sulfinyl group, a thiocarbonyl group, an ammonium group, an imide group, a hydrazo group, an azo group, a diazo group, a carboxyl group, a nitrile group, a pyridyl group, an alkoxy group, a hydroxyl group, an oxy group and an epoxy group. These functional groups may have a substituent.

Further, as the modified SBR, for example, an SBR modified with a compound (modifier) represented by the following formula can be used.

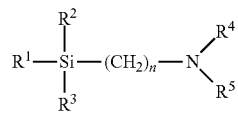

In the formula, $R^1$, $R^2$ and $R^3$, which are the same or different, represent an alkyl group, an alkoxy group, a silyloxy group, an acetal group, a carboxyl group (—COOH), a mercapto group (—SH) or a derivative thereof; $R^4$ and $R^5$, which are the same or different, represent hydrogen atom or an alkyl group, and $R^4$ and $R^5$ may combine to form a ring structure with nitrogen atoms; and n represents an integer.

As the modified SBR modified by the compound (modifier) represented by the above formula, SBR in which the polymerization end (active end) of the solution-polymerized styrene-butadiene rubber (S-SBR) is modified by the compound represented by the above formula (modified SBR described in JP-A-2010-111753 or the like) can be used.

Alkoxy groups are preferable as $R^1$, $R^2$ and $R^3$ (preferably an alkoxy group having 1 to 8 carbon atoms, and more preferably an alkoxy group having 1 to 4 carbon atoms). Alkyl groups (preferably alkyl groups having 1 to 3 carbon atoms) are suitable as $R^4$ and $R^5$. Preferably, n is 1 to 5, more preferably 2 to 4, and further more preferably 3. Further, when $R^4$ and $R^5$ are combined to form a ring structure together with a nitrogen atom, a 4- to 8-membered ring is preferable. The alkoxy group also includes a cycloalkoxy group (cyclohexyloxy group, etc.) and an aryloxy group (phenoxy group, benzyloxy group, etc.).

Specific examples of the above modifiers include 2-dimethylaminoethyltrimethoxysilane, 3-dimethylaminopropyltrimethoxy-silane, 2-dimethylaminoethyltriethoxysilane, 3-dimethylaminopropyl-triethoxysilane, 2-diethylaminoethyltrimethoxysilane, 3-diethylaminopropyltrimethoxysilane, 2-diethylaminoethyltriethoxysilane, and 3-diethyl-aminopropyltriethoxysilane. These may be used alone or in combination of two or more.

Further, as the modified SBR, a modified SBR modified with the following compound (modifier) can also be used. Examples of the modifier include polyglycidyl ethers of polyhydric alcohols such as ethyleneglycol diglycidyl ether, glycerin triglycidyl ether, trimethylolethane-triglycidyl ether and trimethylolpropane triglycidyl ether;

polyglycidyl ether of aromatic compound having two or more of phenol group such as diglycidylated bisphenol A;

polyepoxy compounds such as 1,4-diglycidylbenzene, 1,3,5-triglycidylbenzene, and polyepoxidized liquid polybutadiene;

epoxy group-containing tertiary amines such as 4,4'-diglycidyldiphenylamine and 4,4'-diglycidyldibenzyl-methylamine;
diglycidylamino compounds such as diglycidylaniline, N, N'-diglycidyl-4-glycidyloxyaniline, diglycidylorthotoluidine, tetraglycidylmetaxylene diamine, tetraglycidylaminodiphenylmethane, tetraglycidyl-p-phenylenediamine, diglycidylaminomethylcyclohexane and tetraglycidyl-1,3-bisaminomethyl cyclohexane;
amino group-containing acid chlorides such as bis-(1-methylpropyl) carbamate chloride, 4-morpholincarbonyl chloride, 1-pyrrolidincarbonyl chloride, N, N-dimethylcarbamate chloride and N, N-diethylcarbamate chloride;
epoxy group-containing silane compounds such as 1,3-bis-(glycidyloxypropyl)tetramethyldisiloxane and (3-glycidyloxypropyl)-pentamethyldisiloxane;
sulfide group-containing silane compounds such as (trimethylsilyl) [3-(trimethoxysilyl) propyl]sulfide, (trimethylsilyl) [3-(triethoxysilyl) propyl]sulfide, (trimethylsilyl) [3-(tripropoxysilyl) propyl]sulfide, (trimethylsilyl) [3-(tributoxysilyl) propyl]sulfide, (trimethylsilyl) [3-(methyldimethoxysilyl) propyl]sulfide, (trimethylsilyl) [3-(methyldiethoxysilyl) propyl]sulfide, (trimethylsilyl) [3-(methyldipropoxysilyl) propyl]sulfide, and (trimethylsilyl) [3-(methyldibutoxysilyl) propyl]sulfide;
N-substituted aziridine compound such as ethyleneimine and propyleneimine;
alkoxysilanes such as methyltriethoxy silane, N, N-bis(trimethylsilyl)-3-aminopropyltrimethoxysilane, N, N-bis(trimethylsilyl)-3-aminopropyltriethoxysilane, N, N-bis(trimethylsilyl)aminoethyltrimethoxysilane and N, N-bis(trimethylsilyl)aminoethyltriethoxysilane;
(thio)benzophenone compounds having an amino group and/or a substituted amino group such as 4-N, N-dimethylaminobenzophenone, 4-N, N-di-t-butylaminobenzophenone, 4-N, N-diphenylamino benzophenone, 4,4'-bis(dimethylamino)benzophenone, 4,4'-bis(diethylamino) benzophenone, 4,4'-bis(diphenylamino)benzophenone and N, N, N', N'-bis-(tetraethylamino)benzophenone;
benzaldehyde compounds having an amino group and/or a substituted amino group such as 4-N, N-dimethylaminobenzaldehyde, 4-N, N-diphenylaminobenzaldehyde and 4-N, N-divinylamino benzaldehyde; N-substituted pyrrolidone such as N-methyl-2-pyrrolidone, N-vinyl-2-pyrrolidone, N-phenyl-2-pyrrolidone, N-t-butyl-2-pyrrolidone and N-methyl-5-methyl-2-pyrrolidone N-substituted piperidone such as N-methyl-2-piperidone, N-vinyl-2-piperidone and N-phenyl-2-piperidone; and N-substituted lactams such as N-methyl-c-caprolactam, N-phenyl-ε-caprolactam, N-methyl-ω-laurilolactam, N-vinyl-ε-laurillolactam, N-methyl-β-propiolactam and N-phenyl-β-propiolactam. In addition to the above, N, N-bis-(2,3-epoxypropoxy)-aniline, 4,4-methylene-bis-(N, N-glycidyl-aniline), tris-(2,3-epoxypropyl)-1,3,5-triazine-2,4,6-triones, N,N-diethylacetamide, N-methylmaleimide, N,N-diethylurea, 1,3-dimethylethyleneurea, 1,3-divinylethyleneurea, 1,3-diethyl-2-imidazolidinone, 1-methyl-3-ethyl-2-imidazolidinone, 4-N,N-dimethylaminoacetophen, 4-N,N-diethylaminoacetophenone, 1,3-bis(diphenylamino)-2-propanone, 1,7-bis(methylethylamino)-4-heptanone, and the like can also be mentioned. The modification with the above compound (denaturing agent) can be carried out by a known method.
As the SBR, for example, SBR manufactured and sold by Sumitomo Chemical Co., Ltd., JSR Corporation, Asahi Kasei Corporation, Zeon Corporation, Versalis, etc. can be used. The SBR may be used alone or in combination of two or more.

(B) BR

The rubber composition may further contain BR, if necessary. In this case, the content of BR in 100 parts by mass of the rubber component is, for example, preferably more than 2 parts by mass, and more preferably more than 4 parts by mass. On the other hand, it is preferably less than 20 parts by mass, more preferably less than 10 parts by mass, and further more preferably less than 6 parts by mass.

The weight average molecular weight of BR is, for example, more than 100,000 and less than 2 million. The vinyl bond amount of BR is, for example, more than 1% by mass and less than 30% by mass. The cis amount of BR is, for example, more than 1% by mass and less than 98% by mass. The trans content of BR is, for example, more than 1% by mass and less than 60% by mass.

The BR is not particularly limited, and BR having a high cis content (cis content of 90% or more), BR having a low cis content, BR containing syndiotactic polybutadiene crystals, and the like can be used. The BR may be either a non-modified BR or a modified BR, and examples of the modified BR include a modified BR into which the above-mentioned functional group has been introduced. These may be used alone or in combination of two or more. The cis content can be measured by infrared absorption spectrum analysis.

As the modified BR, for example, tin-modified BR can also be used. The tin-modified BR can be obtained by polymerizing 1,3-butadiene with a lithium initiator and then adding a tin compound, and the terminal of the tin-modified BR molecule is preferably further bonded by a tin-carbon bond.

Examples of the lithium initiator include lithium-based compounds such as alkyllithium, aryllithium, vinyllithium, organic tin lithium, and organic nitrogen lithium compounds, and lithium metals. By using the lithium initiator as an initiator for tin-modified BR, a tin-modified BR having a high vinyl content and a low cis content can be produced.

Examples of tin compounds include tin tetrachloride, butyltin trichloride, dibutyltin dichloride, dioctyltin dichloride, tributyltin chloride, triphenyltin chloride, diphenyldibutyltin, triphenyltinethoxydo, diphenyldimethyltin, ditriltin chloride, and diphenyltin dioctanoate, divinyldiethyltin, tetrabenzyltin, dibutyltin distearate, tetraallyltin, p-tributyltin styrene and the like.

The content of tin atoms in the tin-modified BR is preferably 50 ppm or more, and more preferably 60 ppm or more. On the other hand, it is preferably 3000 ppm or less, more preferably 2500 ppm or less, and further preferably 250 ppm or less.

The molecular weight distribution (Mw/Mn) of the tin-modified BR is preferably 2 or less, and more preferably 1.5 or less.

The vinyl bond amount in the tin-modified BR is preferably 5% by mass or more, and more preferably 7% by mass or more. On the other hand, the vinyl bond amount of the tin-modified BR is preferably 50% by mass or less, and more preferably 20% by mass or less.

The modified BR and the tin-modified BR described above may be used alone or in combination of two or more.

As the BR, for example, products of Ube Industries, Ltd., JSR Corporation, Asahi Kasei Corporation, and Nippon Zeon Corporation can be used.

(C) Isoprene Rubber

In addition, the rubber composition may further contain isoprene-based rubber, if necessary. In this case, the content of the isoprene-based rubber in 100 parts by mass of the rubber component is preferably, for example, more than 2 parts by mass, and more preferably more than 4 parts by mass. On the other hand, it is preferably less than 40 parts by mass, more preferably less than 20 parts by mass, and further more preferably less than 8 parts by mass.

Examples of the isoprene-based rubber include natural rubber (NR), isoprene rubber (IR), reformed NR, modified NR, modified IR and the like, and NR is preferable from the viewpoint of excellent strength.

As the NR, those, which are common in the tire industry, for example, SIR20, RSS #3, TSR20 and the like, can be used. The IR is not particularly limited, and those which are common in the tire industry, for example, IR 2200 or the like, can be used. Examples of the reformed NR includes deproteinized natural rubber (DPNR) and high-purity natural rubber (UPNR); examples of the modified NR includes epoxidized natural rubber (ENR), hydrogenated natural rubber (HNR) and grafted natural rubber; and examples of the modified IR include epoxidized isoprene rubber, hydrogenated isoprene rubber and grafted isoprene rubber. These may be used alone or in combination of two or more.

(D) Other Rubber Components

Further, as the other rubber component, rubber (polymer) generally used in the production of tires such as nitrile rubber (NBR) may be contained, if necessary.

(b) Compounding Materials Other than Rubber Components (A) Filler

In the present embodiment, the rubber composition preferably contains a filler. Specific examples of the filler include carbon black, silica, calcium carbonate, talc, alumina, clay, aluminum hydroxide and mica. Among them, silica is preferably used as a reinforcing agent, but in this case, it is preferably used in combination with a silane coupling agent. It is also preferable to use carbon black as a reinforcing agent, if necessary.

(i) Silica

The rubber composition preferably contains silica. The BET specific surface area of silica is preferably more than 140 $m^2/g$, more preferably more than 160 $m^2/g$, from the viewpoint of obtaining good durability performance. On the other hand, from the viewpoint of obtaining excellent low rolling resistance, it is preferably less than 250 $m^2/g$, and more preferably less than 220 $m^2/g$. The above-mentioned BET specific surface area is a value of $N_2SA$ measured by the BET method according to ASTM D3037-93.

The content of silica with respect to 100 parts by mass of the rubber component is preferably 30 parts by mass or more, more preferably 40 parts by mass or more, and further preferably 45 parts by mass or more. On the other hand, it is preferably 200 parts by mass or less, more preferably 150 parts by mass or less and 100 parts by mass or less, further preferably 80 parts by mass or less or 60 parts by mass or less, and particularly preferably 55 parts by mass or less.

Examples of silica include dry silica (anhydrous silica) and wet silica (hydrous silica). Among them, wet silica is preferable because it has a large number of silanol groups.

As commercially available products, for example, products of Degussa, Rhodia, Tosoh Silica Co., Ltd., Solvay Japan Co., Ltd., and Tokuyama Corporation can be used.

(ii) Silane coupling agent

As described above, when using silica, it is preferable to use a silane coupling agent in combination. The silane coupling agent is not particularly limited, and examples thereof include sulfide type such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl) tetrasulfide, bis(2-trimethoxysilylethyl)tetrasulfide, bis(2-triethoxysilylethyl)trisulfide, bis(4-trimethoxysilylbutyl) trisulfide, bis(3-triethoxysilylpropyl) disulfide, bis(2-triethoxysilylethyl)disulfide, bis(4-triethoxysilylbutyl) disulfide, bis(3-trimethoxysilylpropyl) disulfide, bis(2-trimethoxysilylethyl))disulfide, bis(4-trimethoxysilylbutyl) disulfide, 3-trimethoxysilylpropyl-N,N-dimethylthiocarbamoyltetrasulfide, 2-triethoxysilylethyl-N, N-dimethylthiocarbamoyltetrasulfide and 3-triethoxysilylpropyl methacrylate monosulfide;

mercapto type such as 3-mercaptopropyltrimethoxysilane, 2-mercaptoethyltriethoxysilane and NXT and NXT-Z manufactured by Momentive;

vinyl type such as vinyl triethoxysilane and vinyl tri methoxysilane; amino type such as 3-aminopropyltriethoxysilane and 3-aminopropyltrimethoxysilane;

glycidoxy type such as γ-glycidoxypropyltriethoxysilane and γ-glycidoxypropyltrimethoxysilane;

nitro-based such as 3-nitropropyltrimethoxysilane and 3-nitropropyltriethoxysilane; and chloro-based such as 3-chloropropyltrimethoxysilane, 3-chloropropyltriethoxysilane. These may be used alone or in combination of two or more.

As the silane coupling agent, for example, products of Degussa, Momentive, Shinetsu Silicone Co., Ltd., Tokyo Chemical Industry Co., Ltd., Azumax Co., Ltd., Toray Dow Corning Co., Ltd. can be used.

The content of the silane coupling agent is, for example, preferably more than 3 parts by mass, more preferably more than 5 parts by mass, further preferably more than 7 parts by mass, and further more preferably 9 parts by mass with respect to 100 parts by mass of silica. On the other hand, it is preferably less than 15 parts by mass, more preferably less than 13 parts by mass, and further more preferably less than 11 parts by mass.

(Iii) Carbon Black

The rubber composition preferably contains carbon black, if necessary. The content of carbon black is, for example, preferably 2 parts by mass or more, and more preferably 3 parts by mass or more with respect to 100 parts by mass of the rubber component. On the other hand, it is preferably 20 parts by mass or less, more preferably 15 parts by mass or less and further preferably 5 parts by mass or less.

The carbon black is not particularly limited, and examples thereof include furnace black (furness carbon black) such as SAF, ISAF, HAF, MAF, FEF, SRF, GPF, APF, FF, CF, SCF and ECF; acetylene black (acetylene carbon black); thermal black (thermal carbon black) such as FT and MT; and channel black (channel carbon black) such as EPC, MPC and CC. These may be used alone or in combination of two or more.

Nitrogen adsorption specific surface area of the carbon black ($N_2SA$) is, for example, more than 30 $m^2/g$ and less than 250 $m^2/g$. The amount of dibutyl phthalate (DBP) absorbed by carbon black is, for example, more than 50 ml/100 g and less than 250 ml/100 g. The nitrogen adsorption specific surface area of carbon black is measured according to ASTM D4820-93, and the amount of DBP absorbed is measured according to ASTM D2414-93.

The specific carbon black is not particularly limited, and examples thereof include N134, N110, N220, N234, N219, N339, N330, N326, N351, N550 and N762. As commercially available products, for example, products of Asahi Carbon Co., Ltd., Cabot Japan Co., Ltd., Tokai Carbon Co., Ltd., Mitsubishi Chemical Corporation, Lion Corporation, Shin Nikka Carbon Co., Ltd., Columbia Carbon Co., Ltd., etc. can be used. These may be used alone or in combination of two or more.

(iv) Other Fillers

In addition to the above-mentioned silica and carbon black, the rubber composition may further contain fillers generally used in the tire industry, such as calcium carbonate, talc, alumina, clay, aluminum hydroxide, mica and graphite. These contents are, for example, more than 0.1 parts by mass and less than 200 parts by mass with respect to 100 parts by mass of the rubber component.

(B) Curable Resin Component

The rubber composition may contain a curable resin component such as a modified resorcin resin or a modified phenol resin, if necessary. It is considered that this makes it possible to increase the rigidity of the rubber composition and obtain good steering stability during high-speed driving.

Specific examples of the modified resorcin resin include Sumikanol 620 (modified resorcin resin) manufactured by Taoka Chemical Industry Co., Ltd., and examples of the modified phenol resin include PR12686 (cashew oil modified phenol resin) manufactured by Sumitomo Bakelite Co., Ltd.

The content of the curable resin component is preferably 1 part by mass or more, and more preferably 2 parts by mass or more, with respect to 100 parts by mass of the rubber component, for example, from the viewpoint of sufficiently improving the complex elastic modulus. On the other hand, from the viewpoint of maintaining the breaking strength, it is preferably 10 parts by mass or less, and more preferably 8 parts by mass or less.

When using the modified resorcin resin, it is preferable to also contain a methylene donor as a curing agent. Examples of the methylene donor include hexamethylenetetramine (HMT), hexamethoxymethylol melamine (HMMM) and hexamethylol melamine pentamethyl ether (HMMPME). It is preferably contained in an amount of 5 parts by mass or more and about 15 parts by mass, with respect to 100 parts by mass of the curable resin component. If it is too small, a sufficient complex elastic modulus may not be obtained. On the other hand, if the amount is too large, the viscosity of the rubber may increase and the workability may deteriorate.

As a specific methylene donor, for example, Sumikanol 507 manufactured by Taoka Chemical Industry Co., Ltd. can be used.

(C) Plasticizer Component

The rubber composition may contain a plasticizer component such as an oil (including a spreading oil), a resin, and a liquid polymer as a component for softening the rubber. The plasticizer component is a component that can be extracted from the vulcanized rubber with acetone. The total content of the plasticizer component is preferably more than 5 parts by mass and more preferably more than 10 parts by mass with respect to 100 parts by mass of the rubber component. On the other hand, it is preferably less than 70 parts by mass, more preferably less than 50 parts by mass, and further more preferably less than 30 parts by mass. The amount of oil contained in the rubber (oil-extended rubber) is also included in this plasticizer component.

(i) Oil

Examples of the oil include mineral oil (generally referred to as process oil), vegetable oil and fat, and a mixture thereof. As the mineral oil (process oil), for example, paraffin-based process oil, aroma-based process oil, naphthen-based process oil and the like can be used. Examples of vegetable oils and fats include castor oil, cottonseed oil, linseed oil, rapeseed oil, soybean oil, palm oil, peanut oil, rosin, pine oil, pine tar, tall oil, corn oil, rice oil, beni flower oil, sesame oil, olive oil, sunflower oil, palm kernel oil, *camellia* oil, jojoba oil, macadamia nut oil, and tung oil. These may be used alone or in combination of two or more.

Specific examples of process oils (mineral oils) include products of Idemitsu Kosan Co., Ltd., Sankyo Yuka Kogyo Co., Ltd., Japan Energy Co., Ltd., Orisoi Co., Ltd., H & R Co., Ltd., Toyokuni Oil Co., Ltd., Showa Shell Sekiyu Co., Ltd., Fuji Kosan Co., Ltd. and the like can be used.

(ii) Liquid Rubber

The liquid rubber is a polymer in a liquid state at room temperature (25° C.), and is a rubber component that can be extracted from a tire after vulcanization by acetone extraction. Examples of the liquid rubber include farnesene-based polymers, liquid diene-based polymers, and hydrogenated compounds thereof.

The farnesene-based polymer is a polymer obtained by polymerizing farnesene, and has a structural unit based on farnesene. In farnesene, isomers such as a-farnesene ((3E, 7E)-3,7,11-trimethyl-1,3,6,10-dodecatetraene) and 5-farnesene (7,11-dimethyl-3-methylene-1,6,10-dodecatriene), are present.

The farnesene-based polymer may be a homopolymer of farnesene (farnesene homopolymer) or a copolymer of farnesene and a vinyl monomer (farnesene-vinyl monomer copolymer).

Examples of the liquid diene polymer include a liquid styrene-butadiene copolymer (liquid SBR), a liquid butadiene polymer (liquid BR), a liquid isoprene polymer (liquid IR), and a liquid styrene isoprene copolymer (liquid SIR).

Liquid diene polymer has a weight average molecular weight in terms of polystyrene measured by gel permeation chromatography (GPC) (Mw) is, for example, more than $1.0 \times 10^3$, and less than $2.0 \times 10^5$. In the present specification, Mw of the liquid diene polymer is a value measured by gel permeation chromatography (GPC) in terms of polystyrene.

The content of the liquid rubber (total content of the liquid farnesene polymer, the liquid diene polymer, etc.) is, for example, more than 1 part by mass and less than 100 parts by mass with respect to 100 parts by mass of the rubber component.

As the liquid rubber, for example, products of Kuraray Co., Ltd., Clay Valley Co., Ltd. etc., can be used.

(iii) Resin

The resin is a material that not only serves as a plasticizer component but also as an adhesive-imparting ingredient, and may be solid or liquid at room temperature. Specific examples of the resin component include resins such as rosin-based resin, styrene-based resin, cumarone-based resin, terpen-based resin, C5 resin, C9 resin, C5C9 resin, and acrylic-based resin. Two or more kinds of the resins may be used in combination. The content of the resin component is preferably more than 2 parts by mass and less than 45 parts by mass, and more preferably less than 30 parts by mass, with respect to 100 parts by mass of the rubber component.

The rosin-based resin is a resin containing rosin acid as a main component, which is obtained by processing pine fat. This rosin-based resin (rosins) can be classified according to the presence or absence of modification, and can be classified into non-modified rosin (unmodified rosin) and rosin modified product (rosin derivative). Non-modified rosins include tall rosins (also known as tall oil rosins), gum rosins, wood rosins, asymmetric rosins, polymerized rosins, hydrogenated rosins, and other chemically modified rosins. The rosin-modified product is a modified product of non-modified rosin, and examples thereof include rosin esters, unsaturated carboxylic acid-modified rosins, unsaturated carboxylic acid-modified rosin esters, rosin amide compounds, and amine salts of rosin.

The styrene-based resin is a polymer using a styrene-based monomer as a constituent monomer, and examples thereof include a polymer obtained by polymerizing a styrene-based monomer as a main component (50% by mass or more). Specifically, a homopolymer obtained by independently polymerizing styrene-based monomers, such as styrene, o-methylstyrene, m-methylstyrene, p-methylstyrene, a-methylstyrene, p-methoxystyrene, p-tert-butylstyrene, p-phenylstyrene, o-chlorostyrene, m-chlorostyrene and p-chlorostyrene, a copolymer obtained by copolymerizing two or more types of styrene-based monomers, and a copolymer obtained by copolymerizing a styrene-based monomer and another monomer that can be copolymerized with the styrene-based monomer.

Examples of the other monomer include acrylonitriles such as acrylonitrile and methacrylonitrile; unsaturated carboxylic acids such as acrylic acid and methacrylic acid; unsaturated carboxylic acid esters such as methyl acrylate and methyl methacrylate; dienes such as chloroprene, butadiene and isoprene; olefins such as 1-butene and 1-pentene; and a, 8-unsaturated carboxylic acids and acid anhydrides thereof such as maleic anhydride.

Among the cumarone-based resins, the cumarone indene resin is preferable. The cumarone indene resin is a resin containing cumarone and indene as monomer components constituting the skeleton (main chain) of the resin. Examples of the monomer component contained in the skeleton other than cumarone and indene include styrene, a-methylstyrene, methylindene, vinyltoluene and the like.

The content of the cumarone indene resin is, for example, more than 1.0 part by mass and less than 50.0 parts by mass with respect to 100 parts by mass of the rubber component.

The hydroxyl value (OH value) of the cumarone indene resin is, for example, more than 15 mgKOH/g and less than 150 mgKOH/g. The OH value is the amount of potassium hydroxide required to neutralize acetic acid bonded to a hydroxyl group when acetylating 1 g of the resin, and is expressed in milligrams. The OH value is a value measured by a potentiometric titration (JIS K 0070: 1992).

The softening point of the cumarone indene resin is, for example, more than 30° C. and less than 160° C. The softening point is the temperature at which the ball drops when the softening point defined in JIS K 6220-1: 2001 is measured by a ring-ball type softening point measuring device.

Examples of the terpene-based resin include polyterpenes, terpene phenols, and aromatic-modified terpene resins. Polyterpenes are resins obtained by polymerizing terpene compounds, and their hydrogenated products. Terpene compounds are hydrocarbons represented by a composition of $(C_5 H_8)n$ and their oxygenated derivatives, and are compounds having a terpene, classified in monoterpenes $(C_{10}H_{16})$, sesquiterpene $(C_{15}H_{24})$, diterpenes $(C_{20}H_{32})$, etc., as a basic skeleton. Examples thereof include α-pinene, β-pinene, dipentene, limonene, myrcene, aloossimen, ocimene, α-phellandrene, α-terpinene, γ-terpinene, terpinolene, 1,8-cineol, 1,4-cineol, α-terpineol, β-terpineol, and γ-terpineol.

Examples of the polyterpene include terpene resins, such as a-pinene resin, β-pinene resin, limonene resin, dipentene resin, and β-pinene/limonene resin, made from the above-mentioned terpene compound, and hydrogenated terpene resin obtained by hydrogenating the terpene resin can also be mentioned as an example. Examples of the terpene phenol include a resin obtained by copolymerizing the above-mentioned terpene compound and a phenol-based compound, and a resin obtained by hydrogenating the resin. Specifically, a resin obtained by condensing the above-mentioned terpene compound, phenolic compound and the formalin can be mentioned. Examples of the phenolic compound include phenol, bisphenol A, cresol, xylenol and the like. Examples of the aromatic-modified terpene resin include a resin obtained by modifying the terpene resin with an aromatic compound, and a resin obtained by hydrogenating the resin. The aromatic compound is not particularly limited as long as it has an aromatic ring, but for example, phenol compounds such as phenol, alkylphenol, alkoxyphenol, and unsaturated hydrocarbon group-containing phenol; naphthol compounds such as naphthol, alkylnaphthol, alkoxynaphthol, and unsaturated hydrocarbon group-containing naphthol; styrene derivatives such as styrene, alkylstyrene, alkoxystyrene, and unsaturated hydrocarbon group-containing styrene; cumarone; inden; and the like can be mentioned.

The "C5 resin" refers to a resin obtained by polymerizing a C5 fraction. Examples of the C5 fraction include petroleum fractions having 4 to 5 carbon atoms equivalent to cyclopentadiene, pentene, pentadiene, isoprene, and the like. As the C5 petroleum resin, a dicyclopentadiene resin (DCPD resin) is preferably used.

The "C9 resin" refers to a resin obtained by polymerizing a C9 fraction, and may be hydrogenated or modified. Examples of the C9 fraction include petroleum fractions having 8 to 10 carbon atoms equivalent to vinyltoluene, alkylstyrene, indene, methyl indene and the like. As a specific example, a cumarone indene resin, a cumarone resin, an indene resin, and an aromatic vinyl-based resin are preferably used. As the aromatic vinyl resin, a homopolymer of a-methylstyrene or styrene or a copolymer of a-methylstyrene and styrene is preferable because it is economical, easy to process, and has excellent heat generation. A copolymer of a-methylstyrene and styrene is more preferable. As the aromatic vinyl resin, for example, those commercially available from Clayton, Eastman Chemical, etc. can be used.

The "C5C9 resin" refers to a resin obtained by copolymerizing the C5 fraction and the C9 fraction, and may be hydrogenated or modified. Examples of the C5 fraction and the C9 fraction include the above-mentioned petroleum fraction. As the C5C9 resin, for example, those commercially available from Tosoh Corporation, LUHUA, etc. can be used.

The acrylic resin is not particularly limited. For example, a solvent-free acrylic resin can be used.

As the solvent-free acrylic resin, a (meth)acrylic resin (polymer), synthesized by a high-temperature continuous polymerization method (high-temperature continuous lump polymerization method) described in U.S. Pat. No. 4,414,370, JP-A-S59-6207, JP—B-H5-58005, JP-A-H1-313522, U.S. Pat. No. 5,010,166, Toagosei Annual Report TREND2000 No. 3, pp42-45, etc. without using polymerization initiators, chain transfer agents, organic solvents, etc. as auxiliary raw materials as much as possible, can be mentioned. Note that, "(meth)acrylic" means meth acrylic and acrylic.

Examples of the monomer component constituting the acrylic resin include (meta) acrylic acid derivatives such as (meth)acrylic acid, (meth)acrylic acid ester (alkyl ester, aryl ester, aralkyl ester, etc.),(meth)acrylamide , and (meth) acrylamide derivative.

As the monomer component constituting the acrylic resin, styrene, α-methylstyrene, vinyltoluene, vinylnaphthalene, divinylbenzene, trivinylbenzene, divinylnaphthalene, and the like can be used, together with (meth)acrylic acid and/or (meth)acrylic acid derivative.

The acrylic resin may be a resin composed of only a (meth)acrylic component or a resin also having a component other than the (meth)acrylic component as a component. The said acrylic resin may have a hydroxyl group, a carboxyl group, a silanol group or the like.

As the resin component, for example, products of Maruzen Petrochemical Co., Ltd., Sumitomo Bakelite Co., Ltd., Yasuhara Chemical Co., Ltd., Toso Co., Ltd., Rutgers Chemicals Co., Ltd., BASF, Arizona Chemical Co., Ltd., Nitto Chemical Co., Ltd., Co., Ltd, Nippon Catalyst, JX Energy Co., Ltd., Arakawa Chemical Industry Co., Ltd., or Taoka Chemical Industry Co., Ltd. can be used.

(D) Anti-Aging Agent

The rubber composition preferably contains an anti-aging agent. The content of the anti-aging agent is, for example, more than 1 part by mass and less than 10 parts by mass with respect to 100 parts by mass of the rubber component.

Examples of the anti-aging agent include naphthylamine-based anti-aging agents such as phenyl-a-naphthylamine; diphenylamine-based anti-aging agents such as octylated diphenylamine and 4,4'-bis($\alpha$, $\alpha$'-dimethylbenzyl)diphenylamine; p-phenylenediamine-based anti-aging agent such as N-isopropyl-N'-phenyl-p-phenylenediamine, N-(1,3-dimethylbutyl)-N'-phenyl-p-phenylenediamine, and N, N'-di-2-naphthyl-p-phenylenediamine; quinoline-based anti-aging agent such as a polymer of 2,2,4-trimethyl-1,2-dihydroquinolin; monophenolic anti-aging agents such as 2,6-di-t-butyl-4-methylphenol, and styrenated phenol; and bis, tris, polyphenolic anti-aging agent such as tetrakis-[methylene-3-(3',5'-di-t-butyl-4'-hydroxyphenyl) propionate]methane. These may be used alone or in combination of two or more.

As the anti-aging agent, for example, products of Seiko Chemical Co., Ltd., Sumitomo Chemical Co., Ltd., Ouchi Shinko Chemical Industry Co., Ltd., Flexis Co., Ltd., etc. can be used.

(E) Stearic Acid

The rubber composition may contain stearic acid. The content of stearic acid is, for example, more than 0.5 parts by mass and less than 10.0 parts by mass with respect to 100 parts by mass of the rubber component. As the stearic acid, conventionally known ones can be used, and for example, products of NOF Corporation, Kao Corporation, Fujifilm Wako Pure Chemical Industries, Ltd., or Chiba Fatty Acid Co., Ltd. can be used.

(F) Zinc Oxide

The rubber composition may contain zinc oxide. The content of zinc oxide is, for example, more than 0.5 parts by mass and less than 15 parts by mass with respect to 100 parts by mass of the rubber component. Conventionally known zinc oxide can be used. For example, products of Mitsui Metal Mining Co., Ltd., Toho Zinc Co., Ltd., HakusuiTech Co., Ltd., Shodo Chemical Industry Co., Ltd., Sakai Chemical Industry Co., Ltd., etc. can be used.

(G) Cross-Linking Agent and Vulcanization Accelerator

The rubber composition preferably contains a cross-linking agent such as sulfur. The content of the cross-linking agent is, for example, more than 0.1 part by mass and less than 10.0 parts by mass with respect to 100 parts by mass of the rubber component.

Examples of sulfur include powdered sulfur, precipitated sulfur, colloidal sulfur, insoluble sulfur, highly dispersible sulfur and soluble sulfur, which are commonly used in the rubber industry. These may be used alone or in combination of two or more.

As the sulfur, for example, products of Tsurumi Chemical Industry Co., Ltd., Karuizawa Sulfur Co., Ltd., Shikoku Chemicals Corporation, Flexis Co., Ltd., Nippon Kanryu Industry Co., Ltd., Hosoi Chemical Industry Co., Ltd., etc. can be used.

Examples of the cross-linking agent other than sulfur include a vulcanizing agent containing a sulfur atom such as Tackylol V200 manufactured by Taoka Chemical Industry Co., Ltd., Duralink HTS (1,6-hexamethylene-sodium dithiosulfate dihydrate) manufactured by Flexis, and KA9188 (1,6-bis(N,N'-dibenzylthiocarbamoyldithio) hexane) manufactured by Lanxess; and an organic peroxide such as dicumyl peroxide.

The rubber composition preferably contains a vulcanization accelerator. The content of the vulcanization accelerator is, for example, more than 0.3 parts by mass and less than 10.0 parts by mass with respect to 100 parts by mass of the rubber component.

Examples of the vulcanization accelerator include thiazole-based vulcanization accelerator such as 2-mercaptobenzothiazole, di-2-benzothiazolyldisulfide, and N-cyclohexyl-2-benzothiazylsulfenamide; thiuram-based vulcanization accelerators such as tetramethylthiuram disulfide (TMTD), tetrabenzyl thiuram disulfide (TBzTD), and tetrakis(2-ethylhexyl) thiuram disulfide (TOT-N);

sulfenamide-based vulcanization accelerators such as N-cyclohexyl-2-benzothiazolesulfenamide, N-t-butyl-2-benzothiazolyl sulfenamide, N-oxyethylene-2-benzothiazolesulfenamide, N-oxyethylene-2 benzothiazolesulfenamide, and N,N'-diisopropyl-2-benzothiazolesulfenamide; and guanidine-based vulcanization accelerators such as diphenylguanidine, dioltotrilguanidine, and orthotrilbiguanidine can be mentioned. These may be used alone or in combination of two or more.

(H) Other

In addition to the above components, the rubber composition may further blend additives commonly used in the tire industry, such as fatty acid metal salts, carboxylic acid metal salts, organic peroxides, reversion (vulcanization return) inhibitors, and the like. The content of these additives is, for example, more than 0.1 parts by mass and less than 200 parts by mass with respect to 100 parts by mass of the rubber component.

(2) Preparation of Rubber Composition

The rubber composition is produced by a general method, for example, by a manufacturing method including a base kneading step of kneading a rubber component with a filler such as silica or carbon black, and a finish kneading step of kneading the kneaded product obtained in the base kneading step and a cross-linking agent.

The kneading can be performed using, for example, a known (sealed) kneader such as a Banbury mixer, a kneader, or an open roll.

The kneading temperature of the base kneading step is, for example, more than 50° C. and less than 200° C., and the kneading time is, for example, more than 30 seconds and less than 30 minutes. In the base kneading step, in addition to the above components, compounding agents conventionally used in the rubber industry, such as softeners such as oil, stearic acid, zinc oxide, antiaging agents, waxes, vulcanization accelerators, etc., may be appropriately added and knead as needed.

In the finish kneading step, the kneaded product obtained in the base kneading step and the cross-linking agent are kneaded. The kneading temperature in the finish kneading step is, for example, more than room temperature and less than 80° C., and the kneading time is, for example, more than 1 minute and less than 15 minutes. In the finish kneading step, in addition to the above components, a vulcanization accelerator, zinc oxide and the like may be appropriately added and kneaded as needed.

(3) Manufacture of Tread Part

Next, the tread portion can be manufactured by molding the rubber composition obtained above into a predetermined tread shape. When the tread portion is formed in multiple layers such as a cap rubber and a base rubber, the rubber composition obtained above is used as a cap rubber constituting the outermost surface layer.

2. Manufacture of Belt Members

The belt member can be manufactured by topping a known belt layer rubber composition on both sides of reinforcing cords (monofilament cords such as steel cords) arranged in parallel at predetermined intervals (50 lines/5 cm or more).

3. Tire Manufacturing

The tire of the present invention can be produced as an unvulcanized tire by molding the tread portion and the belt member obtained above together with other tire members by a usual method on a tire molding machine.

Specifically, the inner liner as a member to ensure the airtightness of the tire, the carcass as a member to withstand the load, impact and filling air pressure received by the tire, a belt member as a member to strongly tighten the carcass to increase the rigidity of the tread, and the like are wound on a molded drum, then both ends of the carcass are fixed to both side edges and a bead part as a member for fixing the tire to the rim is arranged to form a toroid shape, followed by pasting a tread to the central portion of the outer circumference and a sidewall to the outer side in the radial direction to form a side portion; and an unvulcanized tire is manufactured.

In the present embodiment, as described above, a plurality of belt layers may be provided from the viewpoint of increasing the restraint force on the driving tread and facilitating the suppression of the growth of the outer diameter. At this time, in the vulcanized tire, the average distance D (mm) between the cords of the belt layers of each other in the tread portion is preferably 0.6 mm or less. Further, it is preferable that the angle formed by the cord and the straight line parallel to the tire circumferential direction in the tread portion is 100 or more and 350 or less, and the cords of the adjacent belt layers are arranged so as to intersect each other.

The angle of the steel cord is the angle of the steel cord with respect to the tire circumferential direction when the tire is not filled with air, and can be confirmed by peeling the tread portion from the outside in the radial direction of the tire.

Then, the produced unvulcanized tire is heated and pressurized in a vulcanizer to obtain a tire. The vulcanization step can be carried out by applying a known vulcanization means. The vulcanization temperature is, for example, more than 120° C. and less than 200° C., and the vulcanization time is, for example, more than 5 minutes and less than 15 minutes.

At this time, the tire is formed into a shape satisfying the above (formula 1), when the tire is assembled to a regular rim and the internal pressure is 250 kPa.

As specific tires to which the present invention is preferably applied, tires with the size of 145/60R18, 145/60R19, 155/55R18, 155/55R19, 155/70R17, 155/70R19, 165/55R20, 165/55R21, 165/60R19, 165/65R19, 165/70R18, 175/55R19, 175/55R20, 175/55R22, 175/60R18, 185/55R19, 185/60R20, 195/50R20, and 195/55R20 can be mentioned.

A tire of the present embodiment can be used for various tires classified into passenger car tires, truck/bus tires, motorcycle tires, etc. Among the tires that satisfy (formula 1), the tire of the present embodiment is preferably used as a passenger car tire, that is, a tire that mounted on a four-wheeled automobile and having a maximum load capacity of 1000 kg or less. By satisfying (formula 1), it is possible to more preferably contribute to the solution of the problem to be solved by the present invention and to provide a tire having excellent steering stability and fuel efficiency during high-speed driving.

The above-mentioned maximum load capacity is a value that is about 50 to 100 kg smaller than the maximum load capacity specified for each tire in the standard system including the standard on which the tire is based, for example, the maximum load capacity set to the road index (LI) defined by the JATTA standard (Japan Automobile Tire Association standard). Specifically, it is calculated using the following two formulas based on the tire cross-sectional width Wt (mm), tire cross-sectional height Ht (mm) and the tire outer diameter Dt (mm) in a state where the tire is assembled to a regular rim, the internal pressure is 250 kPa and no load is applied. Note that V is the volume of the space occupied by the tire (virtual volume), and (Dt/2-Ht) is the rim diameter (mm).

$$V(mm^3)=[(Dt/2)^2-(Dt/2-Ht)^2]\times \pi \times Wt$$

$$WL(kg)=0.000011\times V+100$$

The above-mentioned maximum load capacity is not particularly limited as long as it is 1000 kg or less, but it is preferably 900 kg or less because, in general, the tire weight tends to increase and the impact transmitted to the tire tends to increase as the maximum load capacity increases. It is more preferably 800 kg or less, and further more preferably 700 kg or less.

Here, the tire weight is preferably 20 kg or less, more preferably 15 kg or less, and further preferably 12 kg or less, 10 kg or less, and 8 kg or less from the viewpoint of softening the impact transmitted to the tire. The tire weight referred to here is the weight of the entire tire, and is the weight including the sealant, sponge, three-dimensional network structure, electronic parts, etc. when they are provided on the tire cavity surface. Further, the tire weight can be appropriately adjusted by the thickness and width of each member constituting the tire, the specific gravity of the rubber composition, the number of steel cords arranged in the belt reinforcing layer, the bead wire configuration, and the like.

EXAMPLES

Hereinafter, the present invention will be described in more detail with reference to Examples. In the following, tires having a tire size of 195/65R15 were manufactured.

1. Manufacture of Tread Components

First, the tread member was manufactured.

(1) Compounding Material

First, each compounding material shown below was prepared.

(A) Rubber component (B) NR: TSR20

(B) SBR: HPR850 manufactured by JSR Corporation (Solution polymerization SBR) (Styrene content: 27.5% by mass, vinyl bond amount: 58.5% by mass)

(C) BR: UBEPOL BR150B manufactured by Ube Industries, Ltd. (cis content: 97% by mass, trans content: 2% by mass)

(b) Compounding materials other than rubber components (A) Carbon Black: Show Black N220 manufactured by Cabot Japan Co., Ltd. ($N_2SA$: 111 $m^2/g$)

(B) Silica: Ultrasil VN3 manufactured by Evonik Industries, Inc. (BET specific surface area: 165 $m^2/g$)

(C) Silane coupling agent: NXT manufactured by Momentive (3-Octanoylthiopropyltriethoxysilane)

(D) Oil: VIVATEC NC500 manufactured by H & R (Aroma process oil)

(E) Resin: Terpene styrene resin TO125 manufactured by Yasuhara Chemical Co., Ltd. (Aromatic modified terpene resin)

(F) Zinc oxide: Zinc Oxide No. 1 manufactured by Mitsui Mining & Smelting Co., Ltd.

(G) Anti-aging agent-1: Nocrack 6C manufactured by Ouchi Shinko Kagaku Kogyo Co., Ltd. (N-Phenyl-N'-(1,3-dimethylbutyl)-p-phenylenediamine)

(H) Anti-aging agent-2: Antage RD manufactured by Kawaguchi Chemical Industry Co., Ltd. (2,2,4-trimethyl-1,2-dihydroquinoline)

(I) Wax: Ozo Ace 0355 manufactured by Nippon Seiro Co., Ltd.

(J) Stearic acid: Stearic acid "Tsubaki" manufactured by NOF CORPORATION (K) Cross-linking agent and vulcanization accelerator Sulfur: Powdered sulfur manufactured by Tsurumi Chemical Industry Co., Ltd.

Vulcanization accelerator-1: Noxeller CZ-G (CZ) manufactured by Ouchi Shinko Kagaku Kogyo Co., Ltd. (N-cyclohexyl-2-benzothiazolyl sulfeneamide)

Vulcanization accelerator-2: Noxeller D (DPG) manufactured by Ouchi Shinko Kagaku Kogyo Co., Ltd. 1,3-Diphenylguanidine)

(2) Production of Rubber Composition

Next, materials other than sulfur and the vulcanization accelerator were kneaded under the condition of 150° C. for 5 minutes using a Banbury mixer according to the respective compounding contents shown in Tables 1 and 2, to obtain a kneaded product.

Then, sulfur and a vulcanization accelerator were added to the obtained kneaded product, and the mixture was kneaded using an open roll for 5 minutes under the condition of 80° C. to obtain a tread rubber composition.

(3) Fabrication of Tread Member

Next, the obtained tread rubber composition was molded into a predetermined shape to prepare a tread member.

2. Fabrication of Belt Members

Separately, a belt member was manufactured. Specifically, after arranging the steel cords having the configurations and outer diameters shown in Tables 1 and 2 with the ends (lines/5 cm) shown in Tables 1 and 2, a known belt layer rubber composition was coated on both sides thereof so that the average distance between the steel cords of the two belt layers becomes the distance D shown in Tables 1 and 2 to produce a belt member having a two-layer structure.

3. Manufacture of Tire

After that, together with other tire members, two layers are pasted together to form an unvulcanized tire so that the steel cord in the belt member intersects a straight line parallel to the tire circumferential direction at the angles shown in Tables 1 and 2; and the formed unvulcanized tire was press vulcanized for 10 minutes under conditions at 170° C. to produce tires for each test of size 195/65R15 (Examples 1 to 5 and Comparative Examples 1 to 5). The weight of each test tire was 7.5±0.1 kg.

In each test tire, the above-mentioned ($L_{80}/L_0$) is 0.5, the total cross-sectional area of the circumferential groove is 22% of the cross-sectional area of the tread portion, and the total volume of the lateral grooves, including a lateral groove in which the groove width/groove depth is 0.65, was 3.5% of the volume of the tread portion.

4. Parameter Calculation

Then, the distance G (mm) from the outermost surface of the tread portion of each test tire to the outermost surface of the belt layer was measured. At the same time, rubber was cut out from the rubber layer on the surface of the tread portion of each test tire to prepare a rubber test piece for viscoelasticity measurement having a length of 40 mm and a width of 4 mm. Then, 30° C. tan δ was measured using Iplexer series manufactured by GABO under conditions of temperature: 30° C., initial strain: 5%, dynamic strain: ±1%, frequency: 10 Hz, deformation mode: tensile. Further, 0. tan δ was measured under the conditions of temperature: 0° C., initial strain: 5%, dynamic strain: ±0.25%, frequency: 10 Hz, and deformation mode: tensile.

The results are shown in Tables 1 and 2.

Thereafter, based on the results, "30° C. tan δ×G", "exr²/4×π" and "0° C. tan δ×G" were calculated. The results are shown in Tables 1 and 2.

5. Performance Evaluation Test (1) Evaluation of Steering Stability During High-Speed Driving Each test tire was mounted to all wheels of the vehicle (domestic FF vehicle, displacement 2000cc), filled with air so that the internal pressure became 250 kPa, and then driven at 120 km/h on the test course on a dry road surface. The handling property at that time was evaluated by the driver sensually on a scale of 5 from 1 to 5. Then, the total score of the evaluation by 20 drivers was calculated.

Next, the result in Comparative Example 3 was set to 100 and the results were indexed based on the following equation to evaluate the steering stability during high-speed driving. The larger the value, the better the steering stability at high-speed driving.

Steering stability=[(Result of test tire)/(Result of Comparative Example3)]×100

(2) Evaluation of Low Fuel Consumption During High-Speed Driving

Each test tire was mounted to all wheels of the vehicle (domestic FF vehicle, displacement 2000cc), filled with air so that the internal pressure became 250 kPa, and then driven on the test course on the dry road surface at a speed of 80 km/h. After going around the course for 10 km, the accelerator was released, and the distance from when the accelerator was turned off until the vehicle stopped was measured.

Next, the result in Comparative Example 2 was set to 100, and the results were indexed based on the following equation to relatively evaluate the low rolling resistance and to evaluate the fuel efficiency at high-speed driving. The larger the value, the longer the distance from the timing when the accelerator is turned off until the vehicle stops, the smaller the rolling resistance in the steady state, showing excellent low rolling resistance and excellent fuel efficiency.

Fuel efficiency=[(Result of test tire)/(Result of Comparative Example 2)]×100

(3) Comprehensive Evaluation

The evaluation results of (1) and (2) above were totaled to form a comprehensive evaluation.

The evaluation results are shown in Tables 1 and 2. In Tables 1 and 2, "1×1" in the cord configuration indicates a monofilament, and "1×2" indicates a twisted cord in which two filaments are twisted together.

TABLE 1

| | Example | | | | | |
|---|---|---|---|---|---|---|
| | 1 | 2 | 3 | 4 | 5 | 6 |
| (Mixing) | | | | | | |
| NR | 10 | 10 | 10 | 10 | 10 | 10 |
| SBR | 80 | 80 | 80 | 80 | 85 | 85 |
| BR | 10 | 10 | 10 | 10 | 5 | 5 |
| Carbon black | 5 | 5 | 5 | 5 | 5 | 5 |
| Silica | 60 | 60 | 50 | 50 | 50 | 50 |
| Silane coupling agent | 6 | 6 | 5 | 5 | 5 | 5 |
| Oil | 15 | 15 | 15 | 15 | 15 | 15 |
| Resin | 3 | 3 | 8 | 8 | 13 | 13 |
| Zinc oxide | 1.5 | 1.5 | 1.5 | 1.5 | 1.5 | 1.5 |
| Anti-aging agent-1 | 1.5 | 1.5 | 1.5 | 1.5 | 1.5 | 1.5 |
| Anti-aging agent-2 | 1 | 1 | 1 | 1 | 1 | 1 |
| Wax | 1 | 1 | 1 | 1 | 1 | 1 |
| Stearic acid | 1 | 1 | 1 | 1 | 1 | 1 |
| Sulfur | 1.7 | 1.7 | 1.7 | 1.7 | 1.7 | 1.7 |
| Vulcanization accelerator-1 | 2.5 | 2.5 | 2.5 | 2.5 | 2.5 | 2.5 |
| Vulcanization accelerator-2 (Code) | 2.5 | 2.5 | 2.5 | 2.5 | 2.5 | 2.5 |
| Cord configuration | 1×1 | 1×1 | 1×1 | 1×1 | 1×1 | 1×1 |
| Outer diameter (mm) | 0.3 | 0.3 | 0.3 | 0.3 | 0.3 | 0.3 |
| Ends e (book/5 cm) (Belt layer) | 60 | 75 | 75 | 75 | 75 | 90 |
| Average distance between cords D (mm) | 0.45 | 0.45 | 0.45 | 0.45 | 0.45 | 0.45 |
| Angle (°) (Parameter) | 28 | 28 | 23 | 23 | 23 | 23 |
| 30° C. tanδ | 0.16 | 0.16 | 0.11 | 0.11 | 0.11 | 0.11 |
| 0° C. tanδ | 0.65 | 0.65 | 0.65 | 0.65 | 0.72 | 0.72 |
| Distance G (mm) from the tread surface | 8.5 | 8.5 | 8.5 | 7.2 | 7 | 7 |
| 30° C. tanδ × G | 1.36 | 1.36 | 0.94 | 0.79 | 0.77 | 0.77 |
| e × r²/4 × π | 4.24 | 5.30 | 5.30 | 5.30 | 5.30 | 6.36 |
| 0° C. tanδ/G | 0.08 | 0.08 | 0.08 | 0.09 | 0.10 | 0.10 |
| (Evaluation results) | | | | | | |
| Steering stability at high-speed driving | 109 | 117 | 126 | 132 | 134 | 140 |
| Low fuel consumption during high-speed driving | 105 | 103 | 109 | 115 | 118 | 116 |
| Comprehensive evaluation | 214 | 220 | 235 | 247 | 252 | 256 |

TABLE 2

| | Comparative Example | | | | |
|---|---|---|---|---|---|
| | 1 | 2 | 3 | 4 | 5 |
| (Mixing) | | | | | |
| NR | 10 | 10 | 10 | 10 | 10 |
| SBR | 80 | 80 | 80 | 80 | 85 |
| BR | 10 | 10 | 10 | 10 | 5 |
| Carbon black | 5 | 5 | 5 | 5 | 5 |
| Silica | 60 | 60 | 60 | 50 | 50 |
| Silane coupling agent | 6 | 6 | 6 | 5 | 5 |
| Oil | 10 | 10 | 15 | 15 | 15 |
| Resin | 45 | 45 | 3 | 8 | 13 |
| Zinc oxide | 1.5 | 1.5 | 1.5 | 1.5 | 1.5 |
| Anti-aging agent-1 | 1.5 | 1.5 | 1.5 | 1.5 | 1.5 |
| Anti-aging agent-2 | 1 | 1 | 1 | 1 | 1 |
| Wax | 1 | 1 | 1 | 1 | 1 |
| Stearic acid | 1 | 1 | 1 | 1 | 1 |
| Sulfur | 1.7 | 1.7 | 1.7 | 1.7 | 1.7 |
| Vulcanization accelerator-1 | 2.5 | 2.5 | 2.5 | 2.5 | 2.5 |
| Vulcanization accelerator-2 (Code) | 2.5 | 2.5 | 2.5 | 2.5 | 2.5 |
| Cord configuration | 1×2 | 1×1 | 1×2 | 1×2 | 1×2 |
| Outer diameter (mm) | 0.59 | 0.3 | 0.59 | 0.59 | 0.59 |
| Ends e (book/5 cm) (Belt layer) | 42 | 42 | 60 | 42 | 42 |
| Average distance between cords D (mm) | 0.45 | 0.45 | 0.45 | 0.45 | 0.45 |
| Angle (°) (Parameter) | 28 | 28 | 28 | 28 | 28 |
| 30° C. tanδ | 0.21 | 0.21 | 0.16 | 0.11 | 0.11 |
| 0° C. tanδ | 1.23 | 1.23 | 0.65 | 0.65 | 0.72 |
| Distance G (mm) from the tread surface | 8.5 | 8.5 | 8.5 | 6.5 | 6.5 |
| 30° C. tanδ × G | 1.79 | 1.79 | 1.36 | 0.72 | 0.72 |
| e × r²/4 × π | 11.48 | 2.97 | 16.40 | 11.48 | 11.48 |
| 0° C. tanδ/G | 0.14 | 0.14 | 0.08 | 0.10 | 0.11 |
| (Evaluation results) | | | | | |
| Steering stability at high speed | 88 | 85 | 100 | 95 | 90 |
| Low rolling resistance (fuel efficiency) | 85 | 100 | 90 | 90 | 95 |
| Comprehensive evaluation | 173 | 185 | 190 | 185 | 185 |

The results in Tables 1 and 2 shows that, when the reinforcing cord is a monofilament, the end e is 50 (lines/5 cm) or more, and the product of the distance G from the land surface closest to the equatorial plane to the monofilament and 30° C. tan δ of the rubber layer constituting the surface of the tread portion is less than 1.5, that is, (formula 1) is satisfied, a pneumatic tire having excellent steering stability and fuel efficiency at high-speed driving can be provided.

Then, it can be seen that, by control of (formula 2) to (formula 6), by appropriate control of 0° C. tan δ of the rubber layer constituting the surface of the tread portion, the angle of the cord and outer diameter, or the like, it is possible to provide pneumatic tires with even better steering stability and fuel efficiency.

Although the present invention has been described above based on the embodiments, the present invention is not limited to the above embodiments. Various modifications can be made to the above embodiments within the same and equivalent scope as the present invention.

What is claimed is:

1. A pneumatic tire having a tread portion with a circumferential groove and a belt layer, wherein
the belt layer includes a monofilament steel cord as a reinforcing cord,
the number of arrangements e (lines/5 cm) of the monofilament steel cords arranged per 5 cm in the tire width direction in the tire radial cross section of the belt layer is 50/5 cm or more,
the distance G (mm) is 6.0 mm or more and 10.0 mm or less, from the surface of the land portion closest to the equatorial plane among land portions separated by the circumferential groove to the monofilament cord, and
the loss tangent (30° C. tan δ) satisfies 30° C. tan δ≤0.11 when the rubber composition constituting the surface of the tread portion is measured under conditions of temperature: 30° C., initial strain: 5%, dynamic strain: ±1%, frequency: 10 Hz, and deformation mode: tensile, and satisfies formula 2, $$30° \text{ C. tan } \delta \times G < 1.0 \quad \text{formula 2}$$

the outer diameter of the monofilament steel cord is 0.1 mm to 0.5 mm, the number of arrangements e (lines/5 cm) of the monofilament steel cord and the outer diameter r (mm) of the monofilament cord steel satisfy formula 3, $$e \times r^2 / 4 \times \pi > 4.0 \qquad \text{formula 3}$$

the loss tangent (0° C. tan δ) and the distance G (mm) satisfy formula 5, $$0° \text{ C. tan } \delta / G < 0.14 \qquad \text{formula 5}$$

2. The pneumatic tire according to claim 1, wherein the loss tangent (0° C. tan δ) and the distance G (mm) satisfy formula 5, 0° C. tan δ/G≤0.10 formula 5.

3. A pneumatic tire having a tread portion with a circumferential groove and a belt layer, wherein the belt layer includes a monofilament steel cord as a reinforcing cord, the number of arrangements e (lines/5 cm) of the monofilament steel cords arranged per 5 cm in the tire width direction in the tire radial cross section of the belt layer is 50/5 cm or more;

the distance G (mm) is 6.0 or more and 10.0 mm or less, from the surface of the land portion closest to the equatorial plane among land portions separated by the circumferential groove to the monofilament cord, and the loss tangent (30° C. tan δ) satisfies 30° C. tan δ≤0.11 when the rubber composition constituting the surface of the tread portion is measured under conditions of temperature: 30° C., initial strain: 5%, dynamic strain: ±1%, frequency: 10 Hz, and deformation mode: tensile, and satisfies formula 2

$$30° \text{ C. tan } \delta \times G < 1.0 \qquad \text{formula 2}$$

the outer diameter of the monofilament steel cord is 0.1 mm to 0.5 mm, the number of arrangements e (lines/5 cm) of the monofilament steel cord and the outer diameter r (mm) of the monofilament cord satisfy formula 3, $$e \times r^2 / 4 \times \pi > 4.0 \qquad \text{formula 3}$$

the loss tangent (0° C. tan δ) is 0.5 or more when the rubber composition constituting the surface of the tread portion is measured under conditions of temperature: 0° C., initial strain: 5%, dynamic strain: ±0.25%, frequency: 10 Hz, and deformation mode: tensile, and the loss tangent (0° C. tan δ) and the distance G (mm) satisfy formula 5, $$0° \text{ C. tan } \delta / G < 0.14 \qquad \text{formula 5}.$$

4. The pneumatic tire according to claim 3, wherein the loss tangent (0° C. tan δ) and the distance G (mm) satisfy formula 5, 0° C. tan δ/G≤0.10 formula 5.

5. A pneumatic tire having a tread portion with a circumferential groove and a belt layer, wherein the belt layer includes a monofilament steel cord as a reinforcing cord, the number of arrangements e (lines/5 cm) of the monofilament steel cords arranged per 5 cm in the tire width direction in the tire radial cross section of the belt layer is 50/5 cm or more, the distance G (mm) is 6.0 mm or more and 10.0 mm or less, from the surface of the land portion closest to the equatorial plane among land portions separated by the circumferential groove to the monofilament cord, and the loss tangent (30° C. tan δ) satisfies 30° C. tan δ≤0.11 when the rubber composition constituting the surface of the tread portion is measured under conditions of temperature: 30° C., initial strain: 5%, dynamic strain: ±1%, frequency: 10 Hz, and deformation mode: tensile, and satisfies formula 2, $$30° \text{ C. tan } \delta \times G < 1.0 \qquad \text{formula 2}$$

the outer diameter of the monofilament cord is 0.1 mm to 0.5 mm the number of arrangements e (lines/5 cm) of the monofilament steel cord and the outer diameter r (mm) of the monofilament steel cord satisfy formula 3, $$e \times r^2 / 4 \times \pi > 4.0 \qquad \text{formula 3}$$

the loss tangent (0° C. tan δ) is 0.5 or more when the rubber composition constituting the surface of the tread portion is measured under conditions of temperature: 0° C., initial strain: 5%, dynamic strain: ±0.25%, frequency: 10 Hz, and deformation mode: tensile.

6. The pneumatic tire according to claim 5, wherein formula 4 is satisfied $$e \times r^2 / 4 \times \pi > 5.0 \qquad \text{formula 4}.$$

7. The pneumatic tire according to claim 5, wherein the loss tangent (0° C. tan δ) is 0.7 or more.

8. The pneumatic tire according to claim 5, wherein the following formula 6 is satisfied $$0° \text{ C. tan } \delta / G < 0.10 \qquad \text{formula 6}.$$

9. The pneumatic tire according to claim 5, wherein the angle formed by the monofilament cord and the straight line parallel to the tire circumferential direction is 10° or more and 35° or less.

10. The pneumatic tire according to claim 5, wherein at least two layers of the belt layer are provided, and at least one set of belt layers adjacent to each other in the radial direction of the tire is arranged at a distance of 0.1 mm or more and 0.8 mm or less.

11. The pneumatic tire according to claim 5, wherein the tread portion has a plurality of circumferential grooves extending continuously in the tire circumferential direction, and the total cross-sectional area of the plurality of circumferential grooves is 10% or more and 30% or less of the cross-sectional area of the tread portion.

12. The pneumatic tire according to claim 5, wherein the tread portion has a plurality of circumferential grooves extending continuously in the tire circumferential direction, and the ratio ($L_{80}/L_0$) of the groove width $L_{80}$ at a depth of 80% of the maximum depth of the circumferential groove to the groove width $L_0$ of the circumferential groove on the ground contact surface of the tread portion is 0.3 or more and 0.7 or less.

13. The pneumatic tire according to claim 5, wherein the tread portion further has a plurality of lateral grooves extending in the tire axial direction, and the total volume of the plurality of lateral grooves is 2.0% or more and 5.0% or less of the volume of the tread portion.

* * * * *